United States Patent
Barish

(10) Patent No.: US 12,250,449 B2
(45) Date of Patent: Mar. 11, 2025

(54) SYSTEMS AND METHODS FOR RAPID CAMERA ILLUMINATION TUNING

(71) Applicant: ZEBRA TECHNOLOGIES CORPORATION, Lincolnshire, IL (US)

(72) Inventor: Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 192 days.

(21) Appl. No.: 18/115,164

(22) Filed: Feb. 28, 2023

(65) Prior Publication Data
US 2024/0292083 A1 Aug. 29, 2024

(51) Int. Cl.
H04N 23/62 (2023.01)
G06V 10/56 (2022.01)
G06V 10/60 (2022.01)

(52) U.S. Cl.
CPC ............ H04N 23/62 (2023.01); G06V 10/56 (2022.01); G06V 10/60 (2022.01)

(58) Field of Classification Search
CPC ........ H04N 23/62; H04N 23/73; H04N 23/71; H04N 23/64; G06V 10/56; G06V 10/60
USPC ...................................................... 348/207.1
See application file for complete search history.

(56) References Cited

U.S. PATENT DOCUMENTS

| | | | | |
|---|---|---|---|---|
| 8,059,154 | B1 * | 11/2011 | Kiro | G06T 7/80 348/184 |
| 9,286,678 | B2 * | 3/2016 | Zhu | G06T 7/80 |
| 10,839,557 | B1 | 11/2020 | Arora et al. | |
| 11,205,283 | B2 * | 12/2021 | Sung | G06T 7/80 |
| 11,348,281 | B1 * | 5/2022 | Tang | H04N 13/246 |
| 11,610,339 | B2 * | 3/2023 | Park | H04N 13/239 |
| 11,809,949 | B2 * | 11/2023 | West | G06K 19/06037 |
| 11,910,089 | B2 * | 2/2024 | Azoulai | G02B 7/1805 |
| 11,967,113 | B2 * | 4/2024 | Islam | H04N 13/246 |
| 12,094,172 | B2 * | 9/2024 | Chang | G06T 7/80 |
| 12,106,517 | B2 * | 10/2024 | Feldman | H04N 17/002 |
| 2008/0095403 | A1 * | 4/2008 | Benhammou | G06T 7/80 382/104 |
| 2013/0169822 | A1 | 7/2013 | Zhu | |
| 2017/0070731 | A1 | 3/2017 | Darling et al. | |

OTHER PUBLICATIONS

International Search Report and Written Opinion for International Application No. PCT/US2024/14785 mailed on May 28, 2024.

* cited by examiner

*Primary Examiner* — Pritham D Prabhakher

(57) ABSTRACT

A system and method for optimizing imaging system parameters includes determining, by a processor, a first set and second set of imaging parameters. An imaging device captures one or more first images according to the first set of imaging parameters while the processor is determining the second set of imaging parameters. The method further includes determining a first score from data associated with the one or more first images, capturing one or more second images according to the second set of imaging parameters, and determining a second score from data associated with the one or more second images. The processor then determines, from the first and second scores, an optimized set of imaging parameters from the first set of imaging parameters and the second set of imaging parameters.

20 Claims, 8 Drawing Sheets

SYSTEMS AND METHODS FOR RAPID CAMERA ILLUMINATION TUNING

BACKGROUND

Industrial scanners and/or barcode readers may be used in consumer stores or warehouse environments and/or other environments and may be provided in the form of mobile scanning devices or stationary scanning systems. These scanners may be used to scan barcodes, packages, consumer products, and other objects. Additionally, machine vision systems are useful for performing object and indicia detection and tracking. For any type of imaging, such as barcode scanning, machine vision applications, etc., proper illumination of a target or environment is necessary to ensure efficient imaging and operation of a system.

For barcode scanners and industrial fixed vision cameras, such as machine vision systems, a critical aspect for functionality is the ability to automatically tune the target illumination, or illumination in a field of view (FOV), of the camera or imaging system. Typically, an install technician sets up the camera or system, places a target item in the FOV of the system, and either manually tunes the illumination, or activates an autotune function to perform a coarse illumination autotune for the system.

Autotune methods often only account for if enough illumination is provided to image a target ignoring many other parameters and image quality factors. For example, systems that utilize autotune illumination often provide too much illumination resulting in glares in images which may obstruct targets causing low-decoding or low object detection efficiencies. Such errors may render the images useless entirely. Additionally, imaging systems such as barcode readers and machine vision systems and applications require faster and faster image capture rates and frame rates. Many autotune illumination processes typically don't account for required low exposure times and fast frame rates to perform object tracking and other machine vision tasks.

Accordingly, there is a need for improved designs having improved functionalities.

SUMMARY

In accordance with a first aspect, a method for optimizing imaging system parameters includes determining, by a processor, a first set of imaging parameters; providing, by the processor, the first set of imaging parameters to an imaging device; determining, by the processor, a second set of imaging parameters different than the first set of imaging parameters; capturing, by the imaging device and while the processor is determining the second set of imaging parameters, one or more first images according to the first set of imaging parameters; providing, by the imaging device, data associated with the one or more first images to the processor; providing, by the processor, the second set of imaging parameters to the imaging device; determining, by the processor, a first score from the data associated with the one or more first images; capturing, by the imaging device and while the processor is determining the first score, one or more second images according to the second set of imaging parameters; providing, by the imaging device, data associated with the one or more second images to the processor; determining, by the processor, a second score from the data associated with the one or more second images; and determining, by the processor, an optimized set of imaging parameters from the first set of imaging parameters and the second set of imaging parameters, the optimized set of parameters determined by comparing the first score and second score.

In a variation of the current embodiment, the first score is determined from at least one of an illumination light color, an exposure time, a decode time, a number of illumination sources, a brightness value, and a gain value, and wherein the second score is determined from at least one of an illumination light color, an exposure time, a decode time, a number of illumination sources, a brightness value, and a gain value.

In variations of the current embodiment, the first set of imaging parameters comprises a first plurality of sets of imaging parameters, and wherein capturing one or more first images comprises capturing a plurality of first images, each first image of the plurality of first images associated with a respective set of imaging parameters of the first plurality of sets of imaging parameters, and the second set of imaging parameters comprises a second plurality of sets of imaging parameters, and wherein capturing one or more second images comprises capturing a plurality of second images, each second image of the plurality of second images associated with a respective set of imaging parameters of the second plurality of sets of imaging parameters. In examples of the current variations, determining the first score includes determining, by the processor, a plurality of potential first scores from data associated with the plurality of first images, with each potential first score of the plurality of potential first scores being associated with a respective image of the plurality of first images; and determining, by the processor, the first score from the plurality of potential first scores, and wherein determining the second score includes determining, by the processor, a plurality of potential second scores from data associated with the plurality of second images, with each potential second score of the plurality of potential second scores being associated with a respective image of the plurality of second images; and determining, by the processor, the second score from the plurality of potential second scores.

In variations of the current embodiment, the method further includes determining, by the processor, after determining the first score and while the imaging device is capturing the one or more second images, a third set of imaging parameters from (i) the first score and (ii) the first set of imaging parameters; providing, by the processor, the third set of imaging parameters to the imaging device; capturing, by the imaging device, one or more third images according to the third set of imaging parameters; providing, by the imaging device, data associated with the one or more third images to the processor; and determining, by the processor, a third score from the data associated with the one or more third images, and wherein determining an optimized set of parameters comprises determining the optimized set of parameters from the first set of parameters, second set of parameters, and third set of parameters, the optimized set of parameters determined by comparing the first score, second score, and third score.

In accordance with another aspect a method for optimizing imaging system parameters includes simultaneously performing a first process and a second process, including: providing, in the first process, a first set of parameters to an imaging device; capturing, in the second process, a first set of one or more images according to the first set of parameters; determining, in the first process, a second set of parameters and providing the second set of parameters to the imaging device; capturing, in the second process, a second set of one or more images according to the second set of parameters; determining, in the first process and while the second process captures the second set of one or more images, a first score from the first set of one or more images; determining, in the first process, a second score from the second set of one or more images; and determining, in the first process, an optimized set of parameters from the first set of parameters and the second set of parameters, the optimized set of parameters determined from the first score and second score.

In variations of the current embodiment, the method further includes determining, in the first process, a third set of parameters from the first score and the first set of parameters; capturing, in the second process, a third set of one or more images according to the third set of parameters; and determining, in the first process, a third score from the third set of one or more images, and wherein determining the optimized set of parameters comprises determining, in the first process, the optimized set of parameters from the first set of parameters, second set of parameters, and third set of parameters, with the optimized set of parameters determined from the first score, second score, and third score.

In variations of the current embodiment, the first score is determined from at least one of an illumination light color, an exposure time, a decode time, a number of illumination sources, a brightness value, and a gain value, and the second score is determined from at least one of an illumination light color, an exposure time, a decode time, a number of illumination sources, a brightness value, and a gain value.

In accordance with yet another aspect an imaging optimization system includes an imaging device configured to capture one or more images of an environment in a field of view of the imaging device; a processor and computer-readable media storage having machine readable instructions stored thereon that, when the machine readable instructions are executed, cause the system to: determine a first set of imaging parameters; provide the first set of imaging parameters to an imaging device; determine a second set of imaging parameters; capture one or more first images according to the first set of imaging parameters while determining the second set of imaging parameters; determine a first score from data associated with the one or more first images; capture one or more second images according to the second set of imaging parameters while determining the first score; determine a second score from data associated with the one or more second images; and determine an optimized set of parameters from the first set of parameters and the second set of parameters, the optimized set of parameters determined by comparing the first score and second score.

In a variation of the current embodiment, the first score is determined from at least one of an illumination light color, an exposure time, a decode time, a number of illumination sources, a brightness value, and a gain value, and the second score is determined from at least one of an illumination light color, an exposure time, a decode time, a number of illumination sources, a brightness value, and a gain value.

In more variations of the current embodiment, the machine readable instructions further cause the system to: determine a third set of parameters from the first score and the first set of parameters; capture a third set of one or more images according to the third set of parameters while determining the second score; and determine a third score from the third set of one or more images, and wherein to determine the optimized set of parameters the machine readable instructions cause the system to determine the optimized set of parameters from the first set of parameters, second set of parameters, and third set of parameters, with the optimized set of parameters determined from the first score, second score, and third score.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
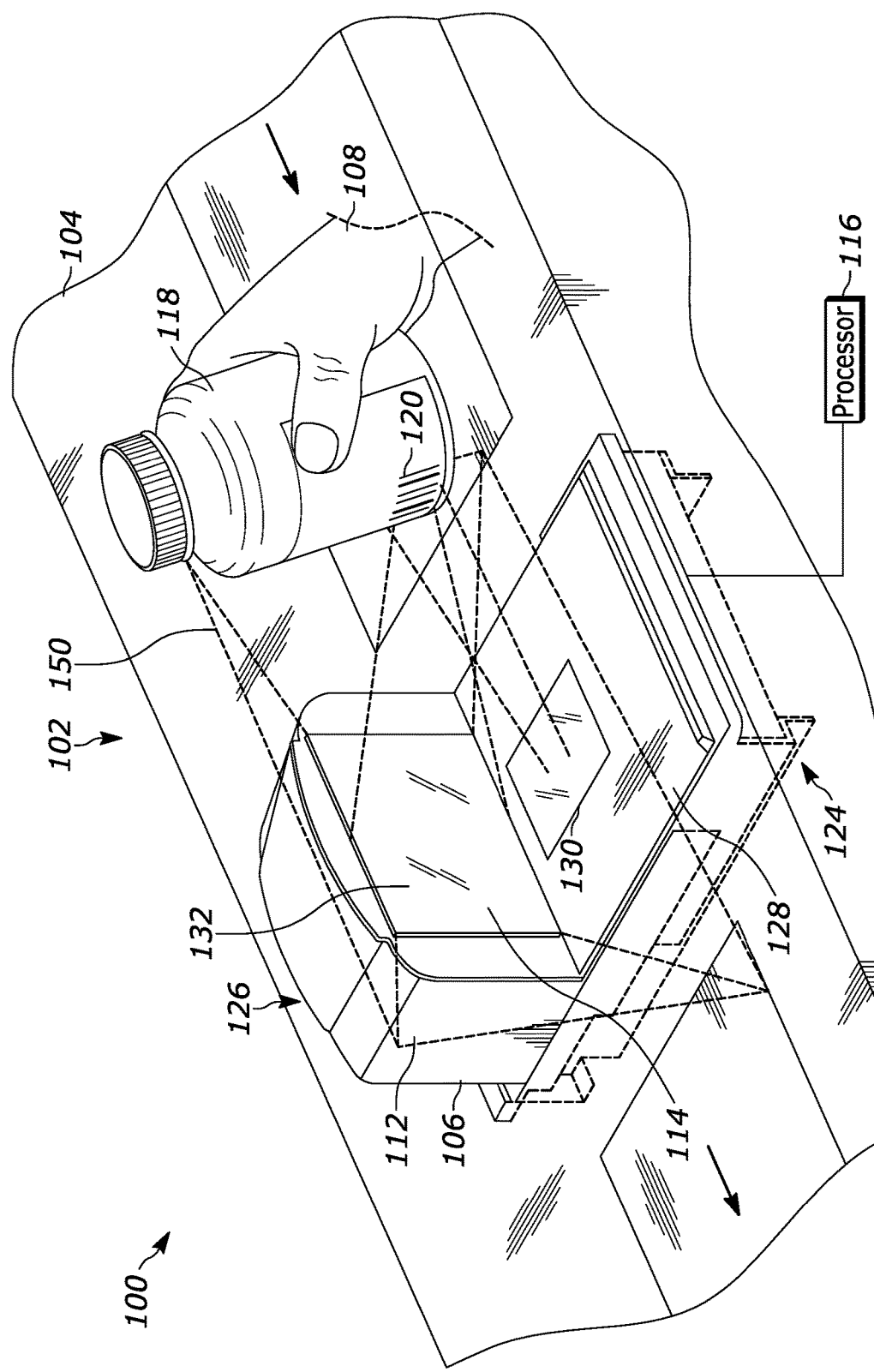
FIG. 1 illustrates a perspective view of an example checkout workstation in accordance with the teachings of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally, pursuant to these various embodiments, a method and system for optimizing imaging system parameters are presented. The imaging system may include barcode scanners, machine vision systems, or another imaging system. The method includes determining one or more sets of imaging system parameters (e.g., exposure time, illumination brightness, resolution, etc.) and capturing images at one or more sets of imaging system parameters. The system simultaneously determines additional one or more sets of imaging system parameters while the images are being captured. The system perform image processing on data associated with the captured images and determines one or more scores for the captured images. The system simultaneously captures second sets of one or more images according to the additional one or more sets of parameters. As such, the system simultaneously (i) analyzes image data of captured images to determine image scores, (ii) determines additional sets of image system parameters for capturing images, and (iii) captures images according to a given set, or sets of imaging parameters.

One benefit of the disclosed methods and systems is that the disclosed methods and associated systems are capable of determining a lowest possible exposure, among other parameters, which enables capturing images, and tracking of objects that may be moving quickly in a field of view (FOV) of an imaging system. Such capabilities are beneficial for object tracking, fast barcode scanning, and other machine vision processes. The described methods and systems determine an absolute optimal illumination using a plurality of system parameters, whereas other implemented illumination autotune processes find a workable illumination without addresses other parameters, resulting in error prone imaging. Further, the described systems and methods are more robust to illumination changes in a FOV of an imaging system.

The described methods include (1) capturing images at multiple illumination configurations (e.g., illumination colors, illumination intensities, exposure times, focus distances, etc.), (2) reducing computation time by concurrently requesting, capturing, and analyzing images, and (3) determining performance scores for each of the different illumination configurations. Traditional tuning methods result in determining a single illumination configuration without exploring a space including many imaging parameters across larger ranges of the parameter capabilities. The current method performs optimization by iterating over multiple optimal configurations to detect which configuration is the best overall configuration for a given application and imaging system. The disclosed technologies enable the ability to check many different imaging configurations in a very time-efficient manner while determining a minimum exposure, reducing glares and reflections, and simultaneously determining a maximum brightness.

FIG. 1 illustrates a perspective view of an example point-of-sale (POS) system 100, for reading barcodes or decoding indicia, in accordance with the teachings of this disclosure. In the example shown, the system 100 includes a workstation 102 with a counter 104 and a bi-optical (also referred to as "bi-optic") barcode reader 106. The barcode reader 106 may also be referred to as a bi-optic scanner or an indicia reader. The POS system 100 is often managed by a store employee such as a clerk 108. However, in other cases, the POS system 100 may be part of a so-called self-checkout lane where instead of a clerk, a customer is responsible for checking out his or her own products.

The barcode reader 106 includes a housing 112 that houses an optical imaging assembly 114. The optical imaging assembly 114 includes one or more image sensors and is communicatively coupled to a processor 116. The image sensors may include one or more color cameras, one or more monochrome imagers, one or more infrared cameras or sensors, one or more optical character readers, etc. The processor 116 may be disposed within the barcode reader 106 or may be in another location. The optical imaging assembly 114 includes one or more fields of view (FsOV) 150. The optical imaging assembly 114 is operable to capture one or more images of one or more targets 118 entering and/or being within the FOV 150. The optical imaging assembly 114 may detect or image targets 118 in the FsOV 150. While referenced herein as one or more targets 118, a target 118 may also be referred to herein as an object of interest, or in short, an object. In any embodiment or description, the target 118, or object of interest, includes one or more product codes 120 or indicia indicative of information associated with the target 118.

In practice, the targets 118, depicted as a bottle in the example shown, is swiped past the barcode reader 106. While illustrated as a single target in FIG. 1 for simplicity and clarity, it is envisioned that the bottle represents multiple targets 118 to be imaged by the optical imaging assembly 114, and that the multiple targets 118 may be within a FOV 150 of the optical imaging system 114 simultaneously or nearly simultaneously. In doing so, one or more product codes 120 associated with the targets 118 are positioned within the FOV of the optical imaging assembly 114. In the example shown, the product code 120 is a bar code. However, the product code 120 may alternatively be a radio-frequency identification (RFID) tag and/or any other product identifying code.

In response to capturing the one or more images (e.g., image data), in an example, the processor 116 processes the image data to determine an absence, a presence, movement, etc. of the targets 118 within and/or relative to the FOV 150 and/or decode regions 155. The processor may capture an image of an FOV 150 of the optical imaging assembly 114 and identify the presence of indicia, such as the product code 120, in the image.

In some examples, the optical imaging assembly 114 has a relatively short focal length that allows the foreground in which the one or more targets 118 may be present to be better isolated from the background, thereby allowing for the targets 118 to be more easily identified and/or tracked within the FOV 150. In some examples, processing the one or more images allows the processor 116 to identify an object that is moving in the FOV 150 and decode regions 155 and to identify an object that is not moving in the FOV 150. The processing may also allow the processor 116 to differentiate between a larger item(s) and a smaller item(s), a direction that the targets 118 are moving within the FOV 150.

In an example, when one or more of the targets 118 are detected entering or being within the FOV 150, the processor 116 initiates an identification session during which one or more product codes 120 carried by the targets 118 can be read/identified. The one or more product codes 120 may be decoded if they are imaged in, or pass through, the FOV 150. The identification session may be defined as a sequence of activation events such as the activation of the optical imaging assembly 114 as described herein. In some examples, the processor 116 compares the one or more images captured by the optical imaging assembly 114 to preceding ones of the one or more images to detect one or more of the targets 118 entering the FOV 150 or being in the FOV 150.

The processor 116 may be configured to identify the one or more targets 118 based on at least a size of the targets 118, a color of the targets 118, a shape of the targets 118, a feature of the targets 118, a logo displayed on the targets 118, etc. In some examples, identifying the product code 120 includes successfully decoding symbology associated with the targets 118. However, if the targets 118 are detected exiting the FOV 150, or decode regions 155, and/or entering and exiting the FOV 150 without the product code 120 being identified, the processor 116 may generate an alert indicative of the targets 118 not being scanned. Such an approach may be advantageous in detecting an individual (e.g., the clerk 108) attempting to avoid scanning the targets 118, which may be referred to as the act of "scan avoidance."

After the processor 116 terminates the identification session, in an example, the processor 116 prevents a subsequent identification session from being initiated until one or more targets 118 are detected existing the FOV 150 of the optical imaging assembly 114. To allow the processor 116 to track the position and/or the movement of the targets 118 within the FOV and/or to identify the targets 118 within the FOV, in some examples, the processor 116 determines a background region 127 (the background region 127 is more clearly shown in FIGS. 5A, 5B, 5C, and 5D) that does not contain any objects or product codes 120. The processor may then remove the background region 127 or otherwise filter the background region 127 from image data and may prevent the background region from displaying any image on a user display.

The housing 112 includes a lower housing 124 and a raised housing 126. The lower housing 124 may be referred to as a first housing portion and the raised housing 126 may be referred to as a tower or a second housing portion. The lower housing 124 includes a top portion 128 with a first optically transmissive window 130. The first window 130 is positioned within the top portion 128 along a generally horizontal plane relative to the overall configuration and placement of the barcode reader 106. In some embodiments, the top portion 128 may include a removable or a non-removable platter (e.g., a weighing platter). The top portion 128 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 128 are illustrated as being about co-planar, that does not have to be the case for the platter and the counter 104 to be considered substantially parallel. In some instances, the counter 104 may be raised or lowered relative to the top surface of the top portion 128, where the top portion 128 is still viewed as being positioned substantially parallel with the counter 104 surface. The raised housing 126 is configured to extend above the top portion 128 and includes a second optically transmissive window 132 positioned in a generally upright plane relative to the top portion 128 and/or the first window 130. Note that references to "upright" include, but are not limited to, vertical. Thus, as an example, something that is upright may deviate from a vertical axis/plane by as much as 45 degrees.

Figure 2:
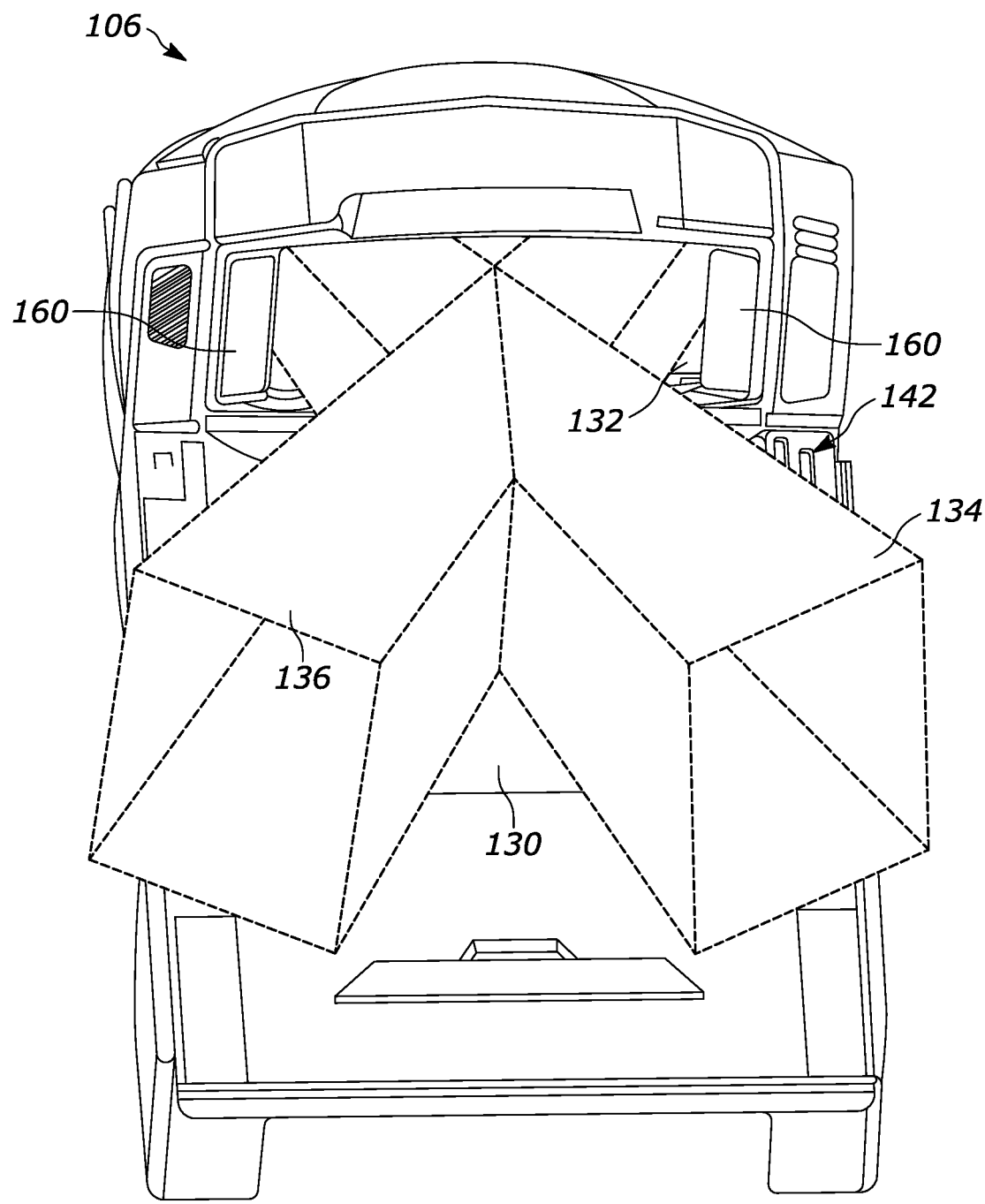
FIG. 2 illustrates example first and second sub-fields of view projecting from a generally vertical window of the barcode reader of FIG. 1.

The raised housing 126 may further include one or more illumination sources 160, as illustrated in FIG. 2. The illumination sources 160 may be disposed adjacent to the second optically transmissive window 132, or the illumination sources 160 may be disposed behind the second transmissive window 132 inside of the raised housing 126. Additional, or fewer, illumination sources may be disposed on the top portion 128 of the lower housing 124, or inside of the lower housing 124. In any embodiments, the illumination sources 160 are disposed to provide illumination to FsOV of imaging sensors and cameras disposed in the raised housing 126 and lower housing 124. The illumination sources may include a blackbody radiation source, one or more light emitting diodes (LEDs), infrared light sources, or another color or white light illumination source.

The optical imaging assembly 114 includes the image sensor(s) that is configured to digitally read the product code 120 through at least one of the first and second windows 130, 132 to detect and decode indicia at various positions and orientations within the FsOV 150 of the imaging assembly 114. The FOV 150 illustrated includes four sub-FOVs, a first sub-FOV 134 (the first sub-FOV 134 is more clearly shown in FIG. 2), a second sub-FOV 136 (the second sub-FOV 136 is more clearly shown in FIG. 2), a third sub field of view 138 (the third sub-FOV 138 is more clearly shown in FIG. 3), and a fourth sub field of view 140 (the fourth sub-FOV 140 is more clearly shown in FIG. 3). In an example, identifying the position of the target 118 through the first and second windows 130, 132 using the optical imaging assembly 114 allows for a virtual three-dimensional (3D) image of the swipe path of the target 118 through the FOV 150 to be identified. The swipe path may include a diagonal swipe path. In addition to monitoring the swipe path, the processor 116 may process the one or more images captured by the optical imaging assembly 114 to track behavior of the clerk 108 including, for example, how the target 118 is held, the swipe direction most followed, etc. Further, the swipe path may be monitored to determine if a given target 118 has already been scanned and/or identified to prevent a re-decoding of a previously decoded product code 120. While the above-example illustrates imaging and tracking a single target 118, in other examples, more than one target swipe path may be imaged and/or tracked.

FIG. 2 illustrates the first and second sub-FsOV 134, 136 projecting from the second window 132 of another example of the barcode reader 106 of FIG. 1. In the currently described embodiment, fold mirrors (not shown) that are carried by the barcode reader 106 are positioned such that the first sub-FOV 134 and the second sub-FOV 136 intersect above the first window 130 and in a product-scanning region 142 of the barcode reader 106. The product-scanning region 142 is the general area where the target 118 is expected to be presented for image capture by the barcode reader 106. In some cases, the fold mirrors can be arranged to cause the first sub-FOV 134 and the second sub-FOV 136 to intersect partially. In other instances, the fold mirrors can be arranged to cause the first sub-FOV 134 and the second sub-FOV 136 to intersect fully. In still other instances, the fold mirrors can be arranged to cause a centroidal axis of each of the first sub-FOV 134 and the second sub-FOV 136 to intersect with or without regard for the cross-sectional dimensions of the FsOV.

Figure 3:
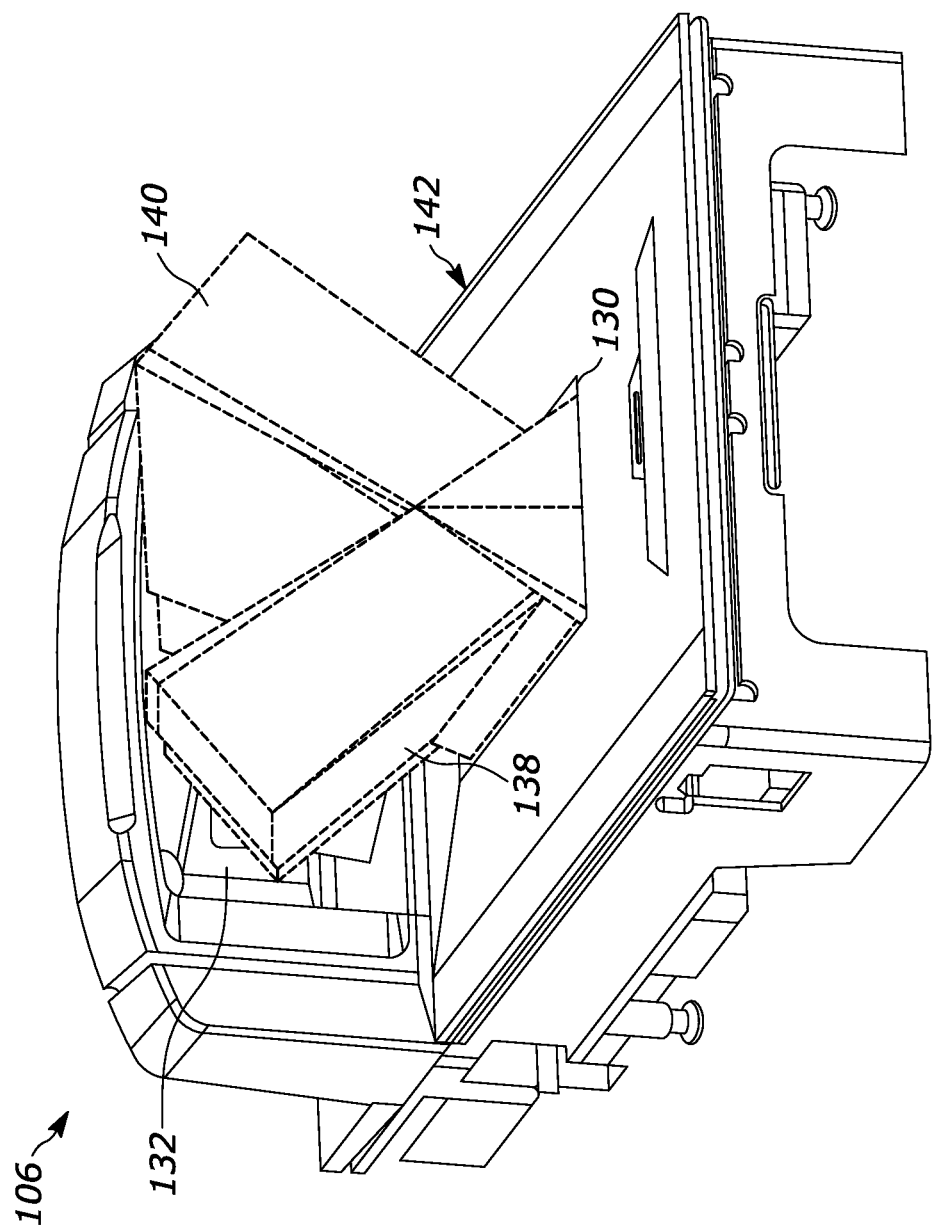
FIG. 3 illustrates example third and fourth sub-fields of view projecting from a generally horizontal window of the barcode reader of FIG. 1.

FIG. 3 illustrates the third and fourth sub FsOV 138, 140 projecting from the first window 130 of the barcode reader 106 of FIG. 2. In the currently described embodiment, the fold mirrors are positioned such that the third sub-FOV 138 and the fourth sub-FOV 140 intersect in front of the second window 132 and in the product-scanning region 142 of the barcode reader 200. In some cases, the fold mirrors can be arranged to cause the third sub-FOV 138 and the fourth sub-FOV 140 to intersect partially. In other instances, the fold mirrors can be arranged to cause the third sub-FOV 138 and the fourth sub-FOV 140 to intersect fully. In still other instances, the fold mirrors can be arranged to cause a centroidal axis of each of the third sub-FOV 138 and the fourth sub-FOV 140 to intersect with or without regard for the cross-sectional dimensions of the FsOV.

Figure 4:
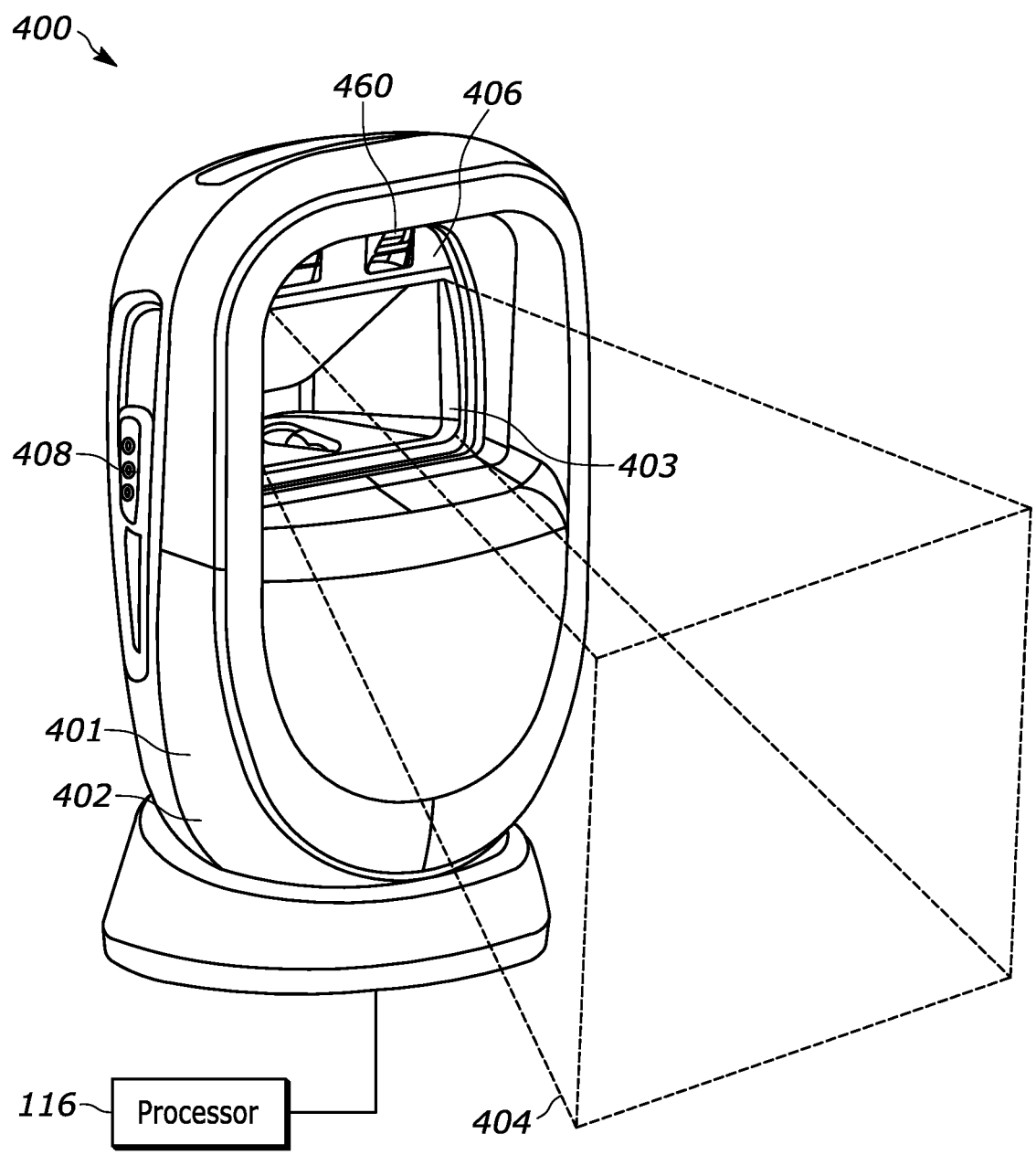
FIG. 4 illustrates an example scanner in accordance with the teachings of this disclosure.

FIG. 4 illustrates a perspective view of another example scanning device 400 in accordance with the teachings of this disclosure. The scanning device 400 may be referred to as an indicia reader, and the scanning device may be handheld to move around a target to scan indicia or the scanning device 400 may be stationary, for example, free standing on a countertop. In the example shown, the scanning device 400 includes a housing 401 having a handle or a lower housing portion 402 and an optical imaging assembly 403. The optical imaging assembly 403 is at least partially positioned within the housing 401 and has a FOV 404. The scanning device 400 also includes an optically transmissive window 406 and a trigger 408. The optical imaging assembly 403 may include one or more image sensors that may include a plurality of photo-sensitive elements (e.g., visible photodetectors, infrared photodetectors or cameras, a color sensor or camera, etc.). The photo-sensitive elements may be arranged in a pattern and may form a substantially flat surface. For example, the photo-sensitive elements may be arranged in a grid or a series of arrays forming a 2D surface. The image sensor(s) of the optical imaging assembly 403 may have an imaging axis that extends through the window 406.

The scanning device 400 includes an illumination source 460 configured to provide illumination to the FOV 404 of the scanning device 400. The illumination source 460 may be disposed behind the window 406, as illustrated in FIG. 4. The scanning device 400 may include more than one illumination source 460 to provide illumination to the FOV 404 of the scanning device 400. The illumination source may include a blackbody radiation source, one or more light emitting diodes (LEDs), infrared light sources, and/or another color or white light illumination source.

To operate the scanning device 400, a user may engage the trigger 408 causing the scanning device 400 to capture an image of a target, a product code, or another object. Alternatively, in some examples, the scanning device 400 may be activated in a presentation mode to capture an image of the target, the barcode, or the other object. In presentation mode, the processor 116 is configured to process the one or more images captured by the optical imaging assembly 403 to identify a presence of a target, initiate an identification session in response to the target being identified, and terminate the identification session in response to a lack of targets in the FOV 404.

Figure 5:
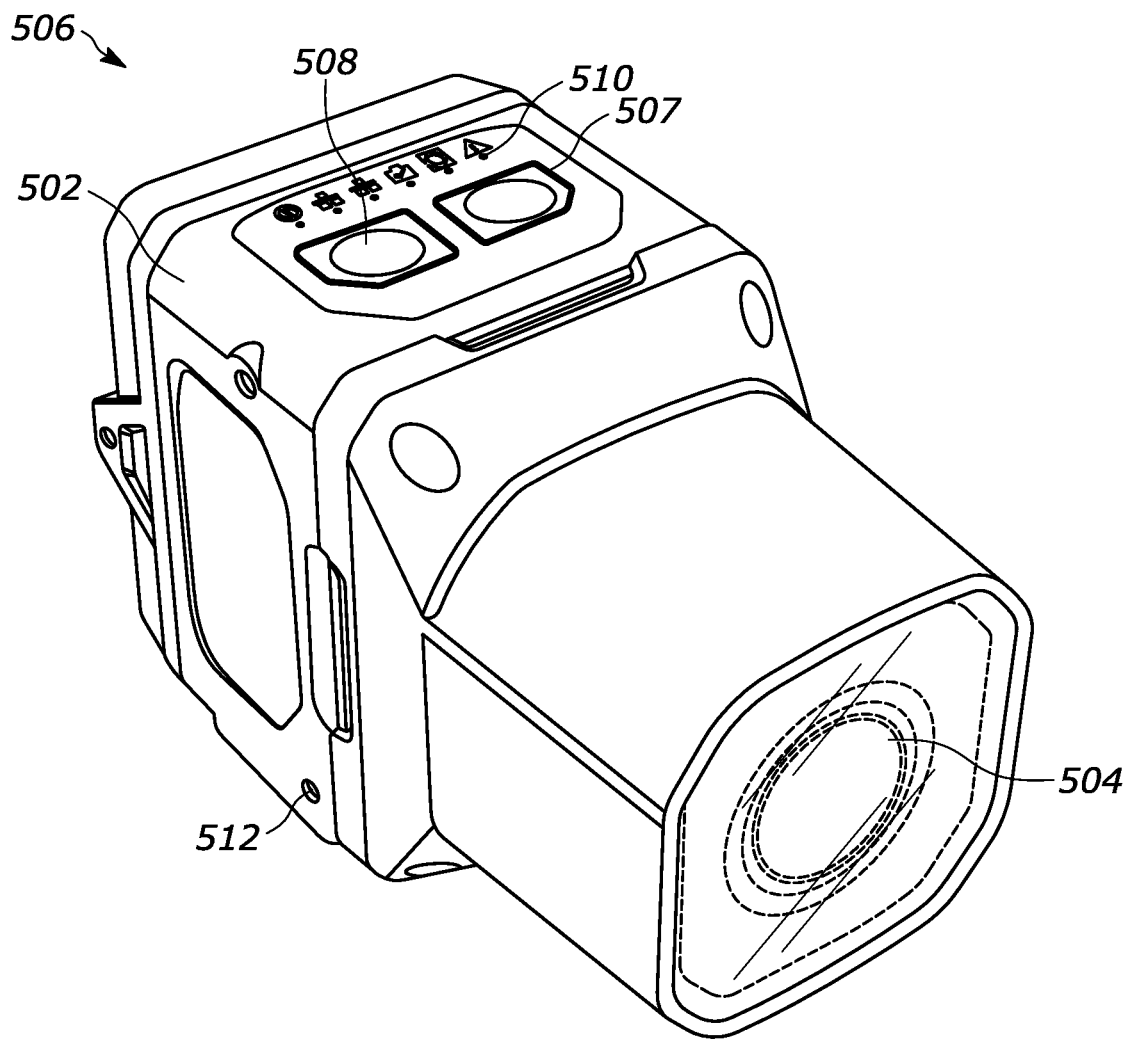
FIG. 5 is a perspective view of a machine vision device in accordance with the teachings of this disclosure.

FIG. 5 is a perspective view of an example machine vision device 506 that may be implemented as an imager for barcode scanning, indicia scanning, or machine vision applications in accordance with embodiments described herein. The machine vision device 506 includes a housing 502, an imaging aperture 504, a user interface label 507, a dome switch/button 508, one or more light emitting diodes (LEDs) 510, and mounting point(s) 512. The machine vision device 306 may obtain job files (e.g., scanning parameters, calibration parameters, etc.) from a which the machine vision device 506 thereafter interprets and executes. The instructions included in the job file may include imaging parameters and illumination parameters discussed further, further discussed in reference to FIGS. 7 and 8. The imaging and illumination parameters operable to adjust the configuration of the machine vision device 506 prior to capturing images of a target object and to determine a best optimal set of imaging and illumination parameters for performing scanning of indicia and/or for machine vision applications.

Figure 6:
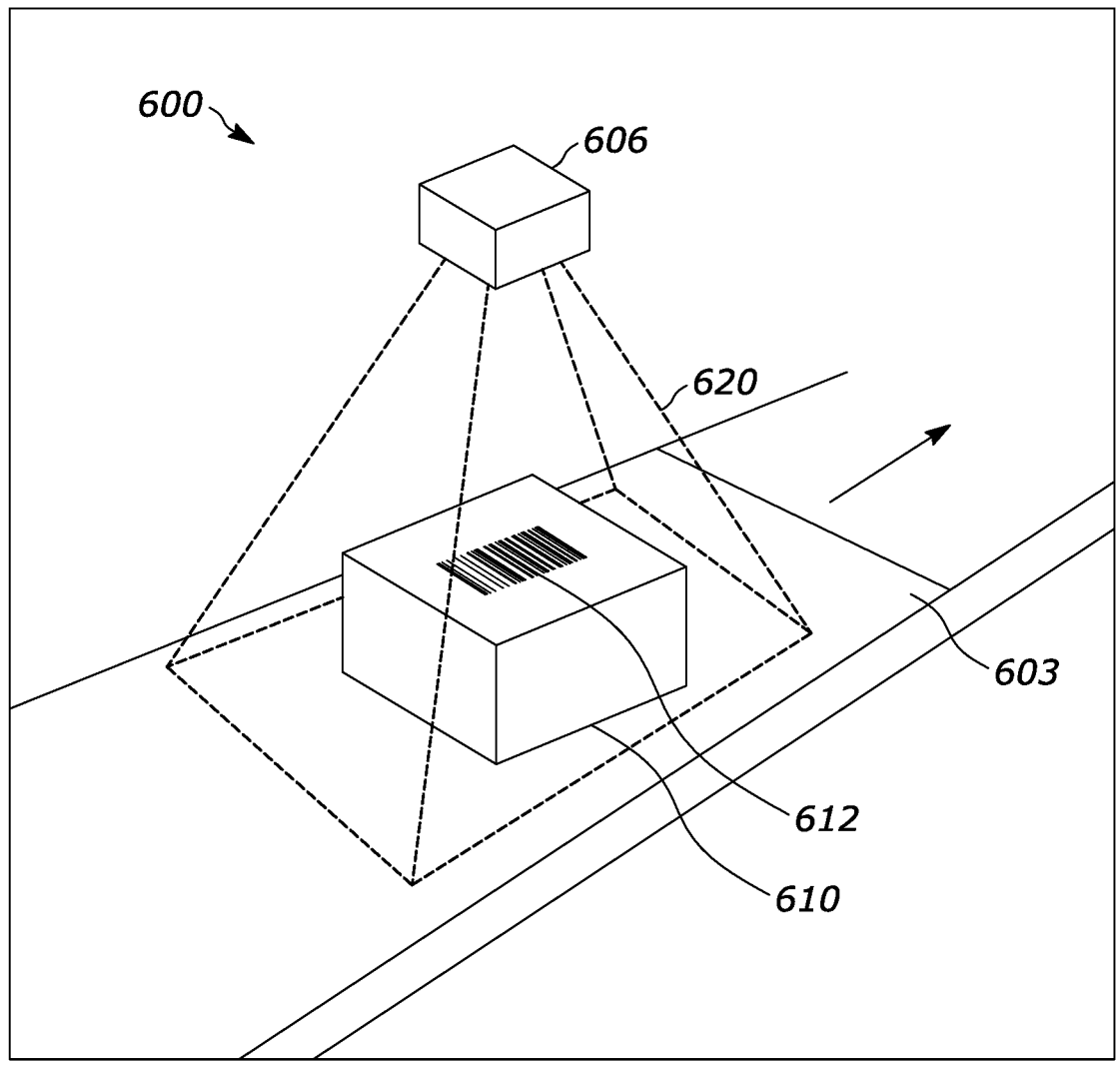
FIG. 6 illustrates an example environment for performing machine vision scanning of an object.

FIG. 6 illustrates an example environment 600 for performing machine vision scanning of an object. In the environment 600 of FIG. 6 a machine vision device 606, which may be a barcode reader or imager such as the scanning device 400 of FIG. 4 or the machine vision device 506 of FIG. 5, is position above a scanning surface 603. The machine vision device 606 may be placed on a counter next to the scanning surface 603 to image one or more objects of interest 610 on the scanning surface 603. The machine vision device 606 is disposed and oriented such that a FOV 620 of the machine vision device 606 includes a portion of the scanning surface 603. The scanning surface 603 may be a table, podium, mount for mounting an object or part, a conveyer, a cubby hole, or another mount or surface that may support a part or object to be scanned. As illustrated, the scanning surface 603 is a conveyer belt having the object of interest 610 thereon. The object of interested 610 is illustrated as being within the FOV 620 of the machine vision device 606. The object of interest 610 contains an indicia 612 thereon with the indicia 612 disposed in the FOV 620.

The machine vision device 606 captures one or more images of the object of interest 610 and decodes the indicia 612.

As illustrated, the indicia 612 is a barcode, but the indicia 612 may individually include one or more of 1D barcode, 2D barcode, QR code, static barcode, dynamic barcode, alphabetical character, text, numerals, alphanumeric, other characters, a picture, vehicle identification number, expiration date, tire identification number, or another indicia having characters and/or numerals. In examples, the object of interest 610 may have more than one indicia, and the machine vision device 604 may capture an image of the FOV 620 and decode one or more indicia in the FOV 620.

The machine vision device 606 may be mounted above the object of interest 610 on a ceiling, a beam, a metal tripod, or another object for supporting the position of the machine vision device 606 for capturing images of the scanning bed 603. Further, the machine vision device 606 may alternatively be mounted on a wall or another mount that faces objects on the scanning bed 603 from a horizontal direction. In examples, the machine vision device 606 may be mounted on any apparatus or surface for imaging and scanning objects of interest that are in, or pass through, the FOV 620 of the machine vision device 606. The described method and system may be implemented for decoding indicia, or identifying text, numerals, or characters in any orientation, and any arrangement.

Figure 7:
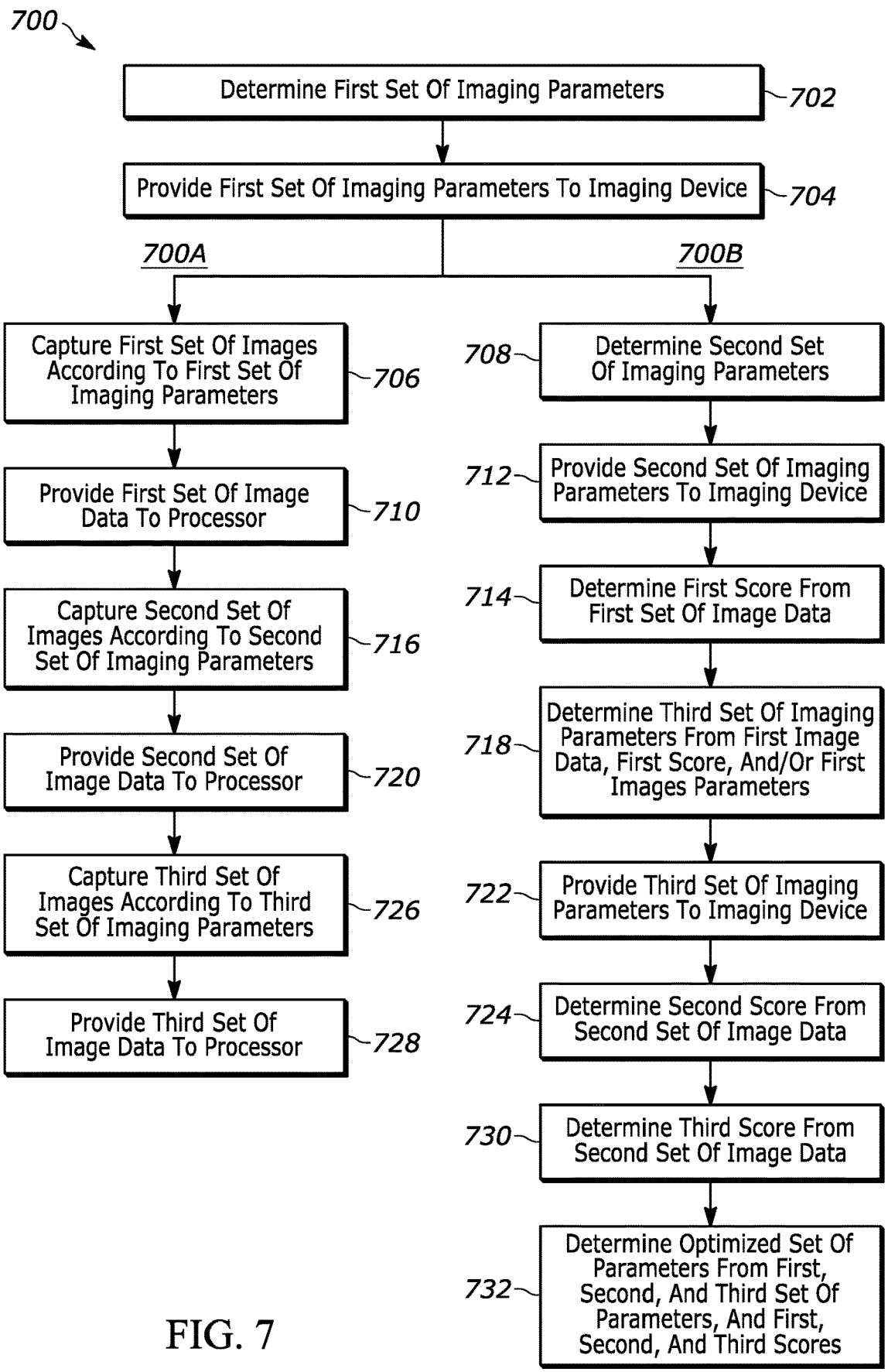
FIG. 7 illustrates a flowchart for performing a method for optimizing imaging system parameters.

FIG. 7 illustrates a flowchart for performing a method for optimizing imaging system parameters. The method may be performed by any of the imaging system 100 of FIGS. 1-3, barcode reader 400 of FIG. 4, and machine vision device 506 of FIG. 5. A process 700 begins at block 702 with a processor determining a first set of imaging parameters. The imaging parameters may include parameters for an illumination source such as a color of illumination provided by a plurality of light emitting diodes (LEDs), an intensity of illumination, a length of time to provide illumination, an illumination pulse train period or duty cycle. Additionally, in implementation with a plurality of LEDs providing illumination, the imaging parameters may include providing illumination by any single, or combination of LEDs. In some implementations, the illumination may be provided by an external device or illumination source, and therefore, the imaging parameters may include tuning on/off the external illumination source and controlling the intensity of the external illumination source. Additionally, the imaging parameters may include operational settings for an imaging device (e.g., a camera, image sensor, etc.) such as an exposure time, a focal distance, a spatial resolution setting, an aperture opening amount (e.g., exposure amount), shutter speed, an International Standards Organization (ISO) setting, and/or a sensor gain amount. The first set of imaging parameters may include a single set of imaging parameters for capturing one or more images at, or the first set of imaging parameters may include a plurality of sets of imaging parameters to capture a plurality of images at the various set of parameters in the first plurality of sets of imaging parameters.

At block 704, the processor provides the first set of imaging parameters to an imaging device such as a camera or image sensor. The imaging device and the processor may be part of a same barcode scanner or machine vision device. Alternatively, the processor may be separate from the imaging device and may provide the imaging device the first set of imaging parameters via wired or wireless communication such as over a network, through external hardware such as a USB device, or a user may manually enter the first set of imaging parameters to the imaging device.

The process 700 then performs two different process branches 700A and 700B simultaneously. The first process branch 700A may be performed primarily by the imaging device, and the second process branch 700B may be performed primarily but a computational device such as the processor. In examples, the steps of blocks 702 and 704 may be considered to be part of the second process branch as they are performed primarily by the processor. At block 706 the imaging device captures a first image, or first set of images, according to the first set(s) of imaging parameters, and therefore, each image captured is associated with corresponding parameters of the first set(s) of imaging parameters. For example, the imaging device may include illumination sources that are set to provide a specific color and intensity of illumination for a period of time specified by the first set of imaging parameters. The imaging device may then capture the first image(s) according to a specified image sensor gain and exposure time as specified by the first set(s) of imaging parameters.

Simultaneous to the imaging device capturing the first image(s), at block 708 the processor determines a second set of imaging parameters. By determining the second set of imaging parameters while the imaging device captures the first image(s) reduces the time required to perform the method of determining optimized imaging system parameters. Additionally, by splitting up tasks among various resources (i.e., the imaging device, and a separate processor) the process is able to perform the steps of the process 700 simultaneously in the two process branches 700A and 700B. The second set of imaging parameters may include a plurality of sets of imaging parameters for capturing a plurality of images. The second set of imaging parameters includes at least one parameter being different than the first set of imaging parameters. For example, the first set of imaging parameters may include providing red illumination to a FOV of an imaging device, and the second set of imaging parameters may include providing white light to the FOV of the imaging device. The second set of imaging parameters may provide a longer exposure time or different F-stop value to the imaging device than the first set of imaging parameters. Typically, decoding of indicia in an image, and capturing images, are the two most resource, and time, consuming processes in performing barcode reading and machine vision processes. Therefore, by performing these two processes simultaneously using different resources speeds up the optimization process.

At block 710, the imaging device provides data indicative of the first image(s) to the processor, and, at block 712, the processor provides the second set(s) of imaging parameters to the imaging device. In examples, the processor may provide the second set(s) of imaging parameters to the imaging device before, after, or while the imaging device is providing the data indicative of the first image(s) to the processor. In any implementations, each of the processor and imaging device may store the image data and/or second set(s) of imaging parameters in a memory until the processor and/or imaging device is ready to perform the next step in each corresponding process branch 700A and 700B.

The processor then performs operations and analyzes the data indicative of the first images and determines a first score for the first images and first set of imaging parameters at block 714. In examples with a plurality of sets of first imaging parameters, and a plurality of first images, the processor may determine a first score for each captured image in the first set of images at. The processor may then determine a highest score of the first plurality of scores and may determine the best overall first score and first set of imaging parameters.

In implementations, the first score may be determined using a plurality of image features or image properties of the first image(s) For example, the processor may determine an image brightness, contrast, decode efficiency or time required to decode indicia in the image, and/or image resolution (e.g., pixels per inch, etc.). Additionally, the first score may be determined using one or more of the parameter values of the first set of parameters. For example, it may be desirable to utilize as few LEDs as possible in illuminating the FOV of the imaging device. Therefore, the first score may use the number of LEDs as a multiplier, or inverse multiplier, to provide weight to the first score based on the number of LEDs used. Alternatively, it may be desirable to use as many LEDs to provide illumination and therefore the score may reflect that as well. Additionally, the first score may be determined using any of illumination intensity, number of LEDs or light sources, period of time of illumination, exposure time, color of illumination (e.g., provide weight values to each color), brightness value, image sensor or camera gain, etc.

In a specific example, the processor determines the first score(s) according to $$\text{Score} = 10 \times C + 1.5E + t_D + 10(4 - S_{LED}) + (255 - B) + G, \quad \text{Eq. 1}$$

where C represents a color value, E is the exposure time in milliseconds, $t_D$ is the time required to decode indicia in the image, $S_{LED}$ is the number of LEDs used to provide illumination to the FOV, B is the brightness value of the image, and G is the image sensor or camera gain value. The color values may be determined based on a given application. For example, it may be desirable to use red light for performing certain scanning operations and therefore, the color 'red' may be given a weight of 1, while the color green may be given a value of 2, and blue may be given a value of 3, etc. In some applications it may be desirable to use colors with longer wavelengths to prevent eye irritation of a user, therefore similar weights or red having lower color values may apply. In other applications white light may be assigned the lowest color value. Other combinations of color values are envisioned for various decoding and machine vision applications. The example of Eq. 1 provides a score based on an imaging device that uses a maximum of four LEDs to provide illumination and determines brightness on a scale of 0 to 255. The decode time is typically on the order of 2 milliseconds to 1 second, and may be between 5 milliseconds to 100 milliseconds. While described as "decode time," it may be understood that the decode time could be a task time. For example, for machine vision tasks it may be desirable to perform a pattern match between a library of patterns and a pattern capture din an image. In such an implementation the decode time, or task time, may be the time required to perform image processing and successfully find a match for the imaged pattern. As such, the "task time" may be any time required to perform an imaging decode, or other task required for imaging and machine visions.

As calculated by Eq. 1, a lower score value is desirable. As such, smaller exposure times, smaller decode times, smaller image sensor gain values, higher brightness, and higher LED count are preferred and rewarded in the calculation of the score in Eq. 1. Eq. 1 presents one potential equation for calculating the first score(s). Other parameters may be used to calculate the score, and different constant weight values may be given to the various parameters in a variety of mathematical relationships to calculate the score.

The processor then determines a third set of imaging parameters with the third set determined based on the first score and/or the first set of imaging parameters at block 718. For example, the processor may reduce the exposure time of the third set of imaging parameters in an attempt to reduce the first score by a given amount. The processor may then provide the third set of imaging parameters to the imaging device at block 722.

While the processor is determining the first score, and potentially while the processor is further determining the third set of imaging parameters, the imaging device captures one or more second image(s) according to the second set(s) of imaging parameters at block 716. The second image(s) being associated with corresponding parameters of the second set(s) of imaging parameters. The imaging device provides data associated with the one or more second images to the processor at block 720

The processor determines a second score from the data associated with the one or more second images. (block 724) The processor may perform image analysis to determine one or more image characteristics or parameters (i.e., resolution, brightness, contrast, etc.), and may use one or more of the second set(s) of imaging parameters to determine the second score. In specific examples, the processor may use Eq. 1 to determine the second score. Further, in implementations wherein the imaging system captures a plurality of second images, the processor may determine a score for each respective image of the plurality of second images, and the processor may choose a best score from the set of second scores. In examples, the processor may determine that the best score is a minimal score or maximal score value among the set of second scores.

While the processor is determining the second score, the imaging device captures one or more images according to the third set of imaging parameters at block 726. The imaging device then provides data associated with the one or more third images to the processor. (block 728) The processor determines a third score from the one or more third images. (block 730) The processor may perform image analysis to determine one or more image characteristics or parameters (i.e., resolution, brightness, contrast, etc.), and may use one or more of the third set(s) of imaging parameters to determine the third score. In implementations wherein the imaging system captures a plurality of third images, the processor may determine a score for each respective image of the plurality of third images, and the processor may choose a best score from the set of third scores. In examples, the processor may determine that the best third score is a minimal score or maximal score value among the set of third scores. The processor may determine the third score according to Eq. 1, or the processor may base the third score on other imaging and system parameters.

The processor then compares the first score, second score, and third score, and determines an optimal set of imaging parameters from the comparison of the first score, second score, and third score. (block 732) The processor may determine that a minimum score among the first, second, and third score is optimal, and therefore, that the corresponding set of imaging parameters is the optimal set of imaging parameters. For example, if the first score and the third score are both greater than the second score, the processor determines that the second score is the lowest, and therefore that the second set of imaging parameters is the optimal set of imaging parameters. The processor may then provide the optimized set of imaging parameters to the imaging device, and the imaging device may be configured to capture one or more images, according to the optimized set of imaging parameters, to decode indicia or to perform machine vision applications.

In implementations, the process 700 may not include determining a third set of imaging parameters, and capturing one or more third images. In such an implementation, the processor may determine the first score and the second score, and the processor then determines an optimized set of imaging parameters from the first set of imaging parameters and the second set of imaging parameters based on the first and second score. For example, the processor may determine that the second score is less than the first score, and therefore, that the second set of imaging parameters is the optimized set of imaging parameters for performing indicia decoding or machine vision applications. In other implementations, the process 700 may be performed for multiple iterations including generating a fourth and fifth, or more, sets of imaging parameters. In such implementations the imaging device may captures four, five, or more images according to respective imaging parameters. The processor may determine the additional sets of imaging parameters based on the scores of the previously captured images, and further based on the previous sets of imaging parameters. As such, the process 700 may explore a wide variable space including multiple imaging parameters as described herein. As previously discussed, the simultaneous capturing of images, and decoding of indicia/determining image scores allows for the process 700 to optimize multiple illumination and imaging parameters more efficiently than other systems and methods. Additionally, the process 700 is capable of optimizing multiple imaging and system parameters that other autocalibration systems do not include in the optimization process.

Figure 8:
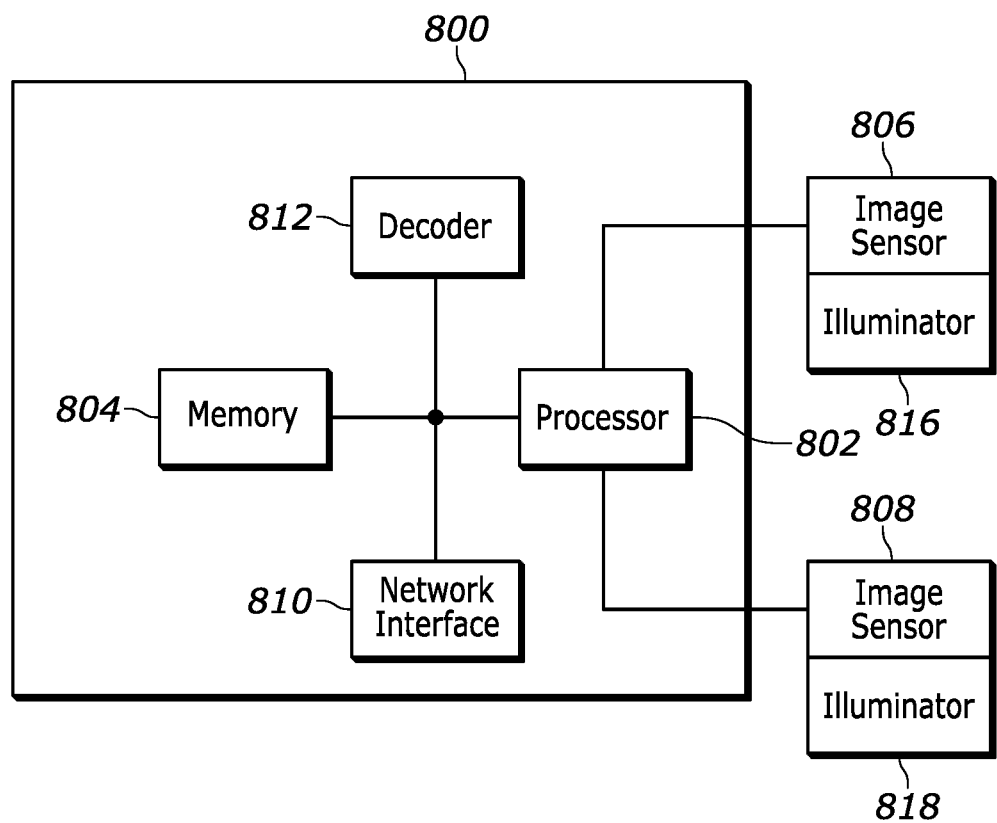
FIG. 8 is a block diagram representative of an example processor platform capable of implementing, for example, one or more components of the example systems for optimizing imaging system parameters.

FIG. 8 is a block diagram representative of an example processor platform 800 capable of implementing, for example, one or more components of the example systems optimizing imaging system parameters. The processor platform 800 includes a processor 802 and memory 804. In the example shown, the processor is coupled to a first image sensor 806 and a second image sensor 808. The image sensors also include illuminators 816 and 818 to provide illumination to a FOV of the respective first and second image sensors 806 and 808. The illuminators 816 and 818 may include multiple LEDs or other light sources. The processor platform 800 and/or one or more of the image sensors 806, 808 may be used to implement the system 100 of FIG. 1, the scanning device 400 of FIG. 4, and/or the machine vision device 506 of FIG. 5. The processor platform 800 further includes a decoder 812 that decodes information associated with indicia. While illustrated as a separate component, the processor 802 may also perform as a decoder 812 to reduce the elements of the processing platform 800.

The memory capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The memory (e.g., volatile memory, non-volatile memory) 804 accessible by the processor 802 (e.g., via a memory controller). The example processor 802 interacts with the memory 804 to obtain, for example, machine-readable instructions stored in the memory 804 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 800 to provide access to the machine-readable instructions stored thereon.

The example processing platform 800 of FIG. 8 also includes a network interface 810 to enable communication with other machines via, for example, one or more networks. The example network interface 810 includes any suitable type of communication interface(s) (e.g., wired and/or wireless interfaces) configured to operate in accordance with any suitable protocol(s).

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

I claim:

1. A method for optimizing imaging system parameters, the method comprising:
   determining, by a processor, a first set of imaging parameters;
   providing, by the processor, the first set of imaging parameters to an imaging device;
   determining, by the processor, a second set of imaging parameters different than the first set of imaging parameters;
   capturing, by the imaging device and while the processor is determining the second set of imaging parameters, one or more first images according to the first set of imaging parameters;
   providing, by the imaging device, data associated with the one or more first images to the processor;
   providing, by the processor, the second set of imaging parameters to the imaging device;
   determining, by the processor, a first score from the data associated with the one or more first images;
   capturing, by the imaging device and while the processor is determining the first score, one or more second images according to the second set of imaging parameters;
   providing, by the imaging device, data associated with the one or more second images to the processor;
   determining, by the processor, a second score from the data associated with the one or more second images; and
   determining, by the processor, an optimized set of imaging parameters from the first set of imaging parameters and the second set of imaging parameters, the optimized set of parameters determined by comparing the first score and second score.

2. The method of claim 1, wherein the first score is determined from at least one of an illumination light color, an exposure time, a decode time, a number of illumination sources, a brightness value, and a gain value, and wherein the second score is determined from at least one of an illumination light color, an exposure time, a decode time, a number of illumination sources, a brightness value, and a gain value.

3. The method of claim 1, wherein the first set of imaging parameters comprises a first plurality of sets of imaging parameters, and wherein capturing one or more first images comprises capturing a plurality of first images, each first image of the plurality of first images associated with a respective set of imaging parameters of the first plurality of sets of imaging parameters, and
   wherein the second set of imaging parameters comprises a second plurality of sets of imaging parameters, and wherein capturing one or more second images comprises capturing a plurality of second images, each second image of the plurality of second images associated with a respective set of imaging parameters of the second plurality of sets of imaging parameters.

4. The method of claim 3, wherein determining the first score comprises:
   determining, by the processor, a plurality of potential first scores from data associated with the plurality of first images, with each potential first score of the plurality of potential first scores being associated with a respective image of the plurality of first images; and
   determining, by the processor, the first score from the plurality of potential first scores, and wherein determining the second score comprises:
   determining, by the processor, a plurality of potential second scores from data associated with the plurality of second images, with each potential second score of the plurality of potential second scores being associated with a respective image of the plurality of second images; and
   determining, by the processor, the second score from the plurality of potential second scores.

5. The method of claim 1, further comprising:
   determining, by the processor, after determining the first score and while the imaging device is capturing the one or more second images, a third set of imaging parameters from (i) the first score and (ii) the first set of imaging parameters;
   providing, by the processor, the third set of imaging parameters to the imaging device;
   capturing, by the imaging device, one or more third images according to the third set of imaging parameters;
   providing, by the imaging device, data associated with the one or more third images to the processor; and
   determining, by the processor, a third score from the data associated with the one or more third images, and wherein determining an optimized set of parameters comprises determining the optimized set of parameters from the first set of parameters, second set of parameters, and third set of parameters, the optimized set of parameters determined by comparing the first score, second score, and third score.

6. The method of claim 1, further comprising:
   providing, by the processor, the imaging device with the optimized set of parameters; and
   configuring the imaging device to capture one or more images according to the optimized set of parameters.

7. The method of claim 1, wherein the imaging device comprises a machine vision system.

8. The method of claim 1, wherein the processor and imaging device and part of an imaging system.

9. A method for optimizing imaging system parameters, the method comprising:
   simultaneously performing a first process and a second process, including:
     providing, in the first process, a first set of parameters to an imaging device;
     capturing, in the second process, a first set of one or more images according to the first set of parameters;
     determining, in the first process, a second set of parameters and providing the second set of parameters to the imaging device;
     capturing, in the second process, a second set of one or more images according to the second set of parameters;
     determining, in the first process and while the second process captures the second set of one or more images, a first score from the first set of one or more images;

determining, in the first process, a second score from the second set of one or more images; and determining, in the first process, an optimized set of parameters from the first set of parameters and the second set of parameters, the optimized set of parameters determined from the first score and second score.

10. The method of claim 9, further comprising:
determining, in the first process, a third set of parameters from the first score and the first set of parameters;
capturing, in the second process, a third set of one or more images according to the third set of parameters; and
determining, in the first process, a third score from the third set of one or more images, and wherein determining the optimized set of parameters comprises determining, in the first process, the optimized set of parameters from the first set of parameters, second set of parameters, and third set of parameters, with the optimized set of parameters determined from the first score, second score, and third score.

11. The method of claim 9, wherein the first score is determined from at least one of an illumination light color, an exposure time, a decode time, a number of illumination sources, a brightness value, and a gain value, and wherein the second score is determined from at least one of an illumination light color, an exposure time, a decode time, a number of illumination sources, a brightness value, and a gain value.

12. The method of claim 9, further comprising configuring an imaging device to capture one or more images according to the optimized set of parameters.

13. The method of claim 9, wherein the second process is performed by a machine vision system.

14. An imaging optimization system comprising:
an imaging device configured to capture one or more images of an environment in a field of view of the imaging device;
a processor and computer-readable media storage having machine readable instructions stored thereon that, when the machine readable instructions are executed, cause the system to:
determine a first set of imaging parameters;
provide the first set of imaging parameters to an imaging device;
determine a second set of imaging parameters;
capture one or more first images according to the first set of imaging parameters while determining the second set of imaging parameters;
determine a first score from data associated with the one or more first images;
capture one or more second images according to the second set of imaging parameters while determining the first score;
determine a second score from data associated with the one or more second images; and
determine an optimized set of parameters from the first set of parameters and the second set of parameters, the optimized set of parameters determined by comparing the first score and second score.

15. The system of claim 14, wherein the first score is determined from at least one of an illumination light color, an exposure time, a decode time, a number of illumination sources, a brightness value, and a gain value, and wherein the second score is determined from at least one of an illumination light color, an exposure time, a decode time, a number of illumination sources, a brightness value, and a gain value.

16. The system of claim 14, wherein the machine readable instructions further cause the system to:
determine a third set of parameters from the first score and the first set of parameters;
capture a third set of one or more images according to the third set of parameters while determining the second score; and
determine a third score from the third set of one or more images, and wherein to determine the optimized set of parameters the machine readable instructions cause the system to determine the optimized set of parameters from the first set of parameters, second set of parameters, and third set of parameters, with the optimized set of parameters determined from the first score, second score, and third score.

17. The system of claim 14, wherein the first set of imaging parameters comprises a first plurality of sets of imaging parameters, and wherein to capture one or more first images the machine readable instructions cause the system to capture a plurality of first images, each first image of the plurality of first images associated with a respective set of imaging parameters of the first plurality of sets of imaging parameters, and wherein the second set of imaging parameters comprises a second plurality of sets of imaging parameters, and wherein to capture one or more second images the machine readable instructions cause the system to capture a plurality of second images, each second image of the plurality of second images associated with a respective set of imaging parameters of the second plurality of sets of imaging parameters.

18. The system of claim 17, wherein to determine the first score and to determine the second score, the machine readable instructions cause the system to:
determine a plurality of potential first scores from data associated with the plurality of first images, with each potential first score of the plurality of potential first scores being associated with a respective image of the plurality of first images; and
determine the first score from the plurality of potential first scores;
determine a plurality of potential second scores from data associated with the plurality of second images, with each potential second score of the plurality of potential second scores being associated with a respective image of the plurality of second images; and
determine the second score from the plurality of potential second scores.

19. The system of claim 14, wherein the imaging device comprises a machine vision system.

20. The method of claim 14, wherein the computer readable instructions further cause the system to configure the imaging device to capture one or more images according to the optimized set of parameters.

* * * * *